Sept. 23, 1924.

A. K. HUNTLEY

DEFERRED ACTION DRY BATTERY

Filed May 4, 1921

1,509,209

Inventor:
Alton K. Huntley,
By Byrnes, Townsend & Brickenstein,
Attorneys.

Patented Sept. 23, 1924.

1,509,209

UNITED STATES PATENT OFFICE.

ALTON KARL HUNTLEY, OF MADISON, WISCONSIN, ASSIGNOR TO NATIONAL CARBON COMPANY, INC., A CORPORATION OF NEW YORK.

DEFERRED-ACTION DRY BATTERY.

Application filed May 4, 1921. Serial No. 466,861.

*To all whom it may concern:*

Be it known that I, ALTON K. HUNTLEY, a citizen of the United States, residing at Madison, in the county of Dane and State of Wisconsin, have invented certain new and useful Improvements in Deferred-Action Dry Batteries, of which the following is a specification.

This invention relates to dry cells of the deferred action type and particularly to cells adapted to be activated by addition of water or electrolyte solution.

In deferred action cells containing paste or liquid during the inactive period and activated by manipulating the electrodes to bring them into operative relation to the excitant, more or less complicated provision must be made to prevent evaporation. Cells containing all the elements necessary for the production of electrical energy with the exception of electrolyte liquid, on the other hand, do not require such provision. They contain no material tending to undergo change and may be kept for as long a period as desired without deterioration. The liquid-activated reserve cell therefore presents points of superiority over other types. It is the object of my invention to provide an improved means whereby the activating liquid may be readily brought into contact with the cell elements and quickly distributed in operative relation to them. This object is attained in general by providing a casing containing one or a plurality of cells and having a storage compartment for liquid, the contents of which may be supplied to the cells by suitably changing the position of the casing.

The invention will be fully described in connection with the accompanying drawings, in which—

Figure 1:
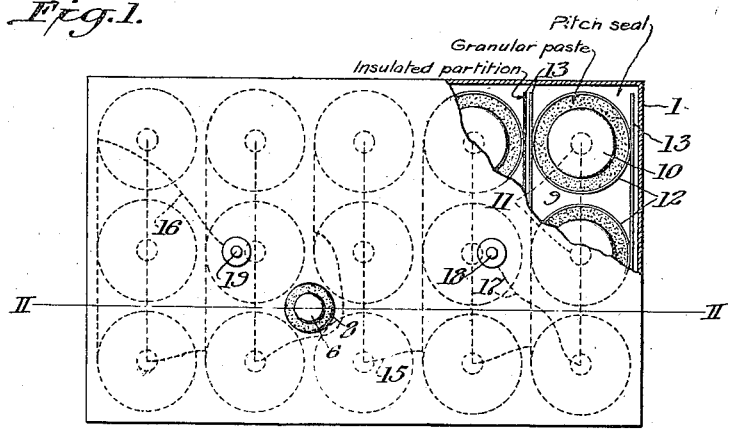
Figure 2:
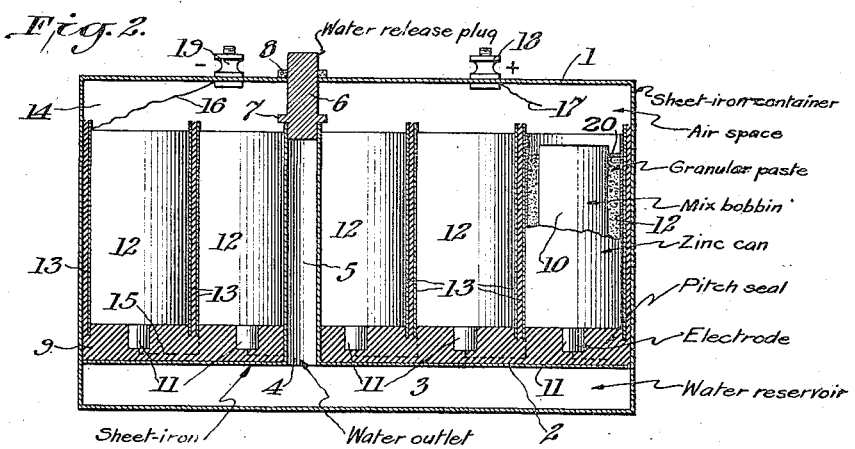

Fig. 1 is a top plan view of a battery casing showing the cells therein in dotted outline, the casing being partially broken away; and Fig. 2 is a vertical longitudinal section on line II—II of Fig. 1.

Referring to the drawing, reference numeral 1 denotes a casing, which may be of sheet metal, and 2 a partition or diaphragm parallel to the base of the casing and forming a liquid storage reservoir 3 adjacent the base. The partition 2 is perforated at 4 and a vertical tube 5 opens into the reservoir through the perforation. A stopper 6 is fitted into the upper end of the tube 5 and extends through a perforation in the top of casing 1. A flange 7 on the stopper prevents it from being drawn through the casing top and is normally seated upon the upper end of tube 5. Sealing means 8 holds the stopper securely in the tube, and so long as the tube is closed as described, the water reservoir 3 is hermetically sealed.

A seal 9 of pitch or other suitable plastic material is placed on the upper surface of partition 2. Mix bobbins 10 are supported in inverted position by embedding their carbon rods 11 in the plastic layer, and zinc cylinders 12, open at both ends, encircle the mix bobbins. The zinc cylinders are entirely surrounded externally by plastic sealing material filling all openings between the cells, thus preventing liquid from getting between them and forming a short circuit. Insulating partitions 13 may be interposed between the zinc cylinders 12 of each transverse group of cells and adjacent the casing ends.

The casing 1 is of such altitude that a chamber 14 preferably substantially equal in volume to reservoir 3, is left above the cells, so that all the liquid in the reservoir may be transferred at one time to the chamber for distribution among the cells. Tube 5 is of sufficient diameter to permit the liquid to pass readily downward therethrough while displacing the air from the absorption chamber 14. Electrical connections of any desired form may be made between the cells by means of conductors embedded in the sealing material. An illustrative arrangement is indicated by numerals 15, 16 and 17, referring to wires adapted to carry the current between the cells and to binding posts 18 and 19, secured in a water tight manner in the top of casing 1.

To activate the battery, the seal 8 is removed and the stopper 6 is drawn out until flange 7 abuts against the under side of the casing top. The casing is then inverted, permitting the liquid to run from storage reservoir 3 into the absorption chamber 14. The stopper is reinserted in the tube 5, to prevent liquid from running back into the reservoir when the cell is restored to its original position. The quantity of liquid should be just sufficient for activation of the number of cells contained in the casing. When the liquid has flowed into the absorption chamber, the casing is returned to the position illustrated, with the absorption chamber uppermost, and the liquid passes downward into activating relation to the cells.

The advantages to be attained by interposing a layer of paste between the mix bobbins and zinc containers of dry cells are well known in the art and I prefer to use this construction, although my invention is not restricted thereto. It is desirable to supply the paste forming substance in such form that substantially immediate activation will be obtained, and to this end a dry granular material such as is described in the copending application of R. C. Benner and H. F. French, Ser. No. 356,496, filed February 5, 1920, may be used. This material may be, for example, coarse ground cereals of various kinds, which may contain electrolyte salts. The granules are of such size as to permit the percolation of the liquid throughout the entire mass before its passage is impeded by gelatinization and swelling of the paste forming material. The material should not be tightly packed and to prevent its displacement when the battery is inverted, a thin porous washer 20 may be fixed above it, between the mix bobbin and the zinc. Similar advantages may be obtained by the use of a bobbin wrapped in dough, as described in the application of F. D. Moyer, Ser. No. 405,789, filed August 25, 1920. In this construction an annular space is left between the wrapped bobbin and the zinc into which the liquid may pass, thus coming into contact with the entire exterior surface of the bobbin coating and rapidly causing it to expand into contact with the zinc. In either of these constructions, the excitant liquid is very rapidly absorbed by the paste forming material and the cells are capable almost immediately of giving a voltage and amperage equal to that of the best cells of the non-deferred type.

In principle the construction described is applicable to a casing containing a single cell, but it is especially advantageous for the simultaneous activation of a number of cells. The invention is not limited to the particular form and arrangement of the cells and the storage and absorption reservoirs. A lateral storage chamber may be substituted, for example, and various other changes may be made in the relative adjustment of the elements without departing from the invention as defined in the appended claims.

I claim:

1. In a battery of dry cells of the deferred action type, self-contained means for activating the cells, said means comprising a chamber initially containing liquid and adapted to discharge the same in the activating position of the battery, and a closed chamber for receiving the discharged liquid and presenting it for absorption by the cells.

2. A battery of dry cells of the deferred action type, comprising a closed casing containing said cells and a supply of liquid sufficient to activate them but out of contact therewith, and means for permitting the gravity flow of said liquid into activating position upon elevating the liquid supply with respect to the cells.

3. The invention described in claim 2 in which the last named means comprises a distribution chamber adapted to supply liquid to all the cells simultaneously.

4. A dry cell of the deferred action type comprising a closed casing containing an anode and a depolarizing cathode, a storage compartment for excitant liquid within said casing and adjacent the bottom thereof, and means operative upon reversal of the casing for transferring the liquid into operative relation to the electrodes.

5. A dry cell of the deferred action type comprising a closed casing containing an anode and a depolarizing cathode, a storage compartment for excitant liquid within said casing and adjacent the bottom thereof, and a tube for transferring the liquid from the storage compartment to a point adjacent the top of the casing, whereby the liquid may be brought into operative relation to the electrodes.

6. In a battery of deferred action dry cells of the liquid activated type, a casing in which the battery cells are intermediately disposed, a liquid storage chamber on one side of said battery cells and out of contact therewith, an absorption chamber on the other side of the battery cells and opening into the cells, and means for transferring liquid from the storage to the absorption chamber.

7. A battery of deferred action dry cells, comprising a closed casing containing a plurality of cells, a liquid storage reservoir in said casing, a tube leading from said reservoir, and means normally sealing said tube but removable to permit flow of liquid through the tube into contact with the cells.

8. The invention according to claim 7, in which the sealing means comprises a stopper passing through an opening in an exterior wall of the casing and having an abutment preventing its complete withdrawal therethrough.

9. A battery of deferred action dry cells, comprising a closed casing containing two compartments adapted to contain liquid, dry cells so disposed as to receive liquid from one compartment, and means for transferring liquid from the other compartment to said compartment when the battery is inverted.

In testimony whereof, I affix my signature.
ALTON KARL HUNTLEY.